(12) United States Patent
Hartmaier

(10) Patent No.: US 6,304,753 B1
(45) Date of Patent: Oct. 16, 2001

(54) INTEGRATION OF VOICE AND DATA SERVICES PROVIDED TO A MOBILE WIRELESS DEVICE

(75) Inventor: Peter J. Hartmaier, Woodinville, WA (US)

(73) Assignee: Openwave Technologies Inc., Redwood City, CA (US)

( * ) Notice: Subject to any disclaimer, the term of this patent is extended or adjusted under 35 U.S.C. 154(b) by 0 days.

(21) Appl. No.: 09/116,507

(22) Filed: Jul. 16, 1998

(51) Int. Cl.[7] .............................. H04Q 7/20; H04Q 7/36; H04Q 7/38

(52) U.S. Cl. .................... 455/413; 455/414; 455/412; 455/426; 455/422; 455/550; 455/424; 455/435; 370/352; 370/351; 370/356; 370/338; 370/349

(58) Field of Search ..................... 455/413, 414, 455/412, 426, 422, 550, 551, 560, 424, 552, 433, 435, 45; 370/352, 351, 356, 338, 349

(56) References Cited

U.S. PATENT DOCUMENTS

| 5,159,592 | 10/1992 | Perkins | 370/85.7 |
|---|---|---|---|
| 5,325,362 | 6/1994 | Aziz | 370/94.3 |
| 5,414,752 | 5/1995 | Jonsson | 379/58 |
| 5,564,070 | 10/1996 | Want et al. | 455/53.1 |
| 5,636,216 | 6/1997 | Fox et al. | 370/402 |
| 5,708,655 | 1/1998 | Toth et al. | 370/313 |
| 5,729,544 | 3/1998 | Lev et al. | 370/352 |
| 5,752,186 * | 5/1998 | Malackowski et al. | 455/414 |
| 5,758,293 | 5/1998 | Frasier | 455/556 |
| 5,901,352 * | 5/1999 | St-Pierre et al. | 455/433 |
| 6,018,657 * | 1/2000 | Kennedy, III et al. | 455/426 |

FOREIGN PATENT DOCUMENTS

| 0851703 | 7/1998 | (EP) | H04Q/7/38 |
|---|---|---|---|
| 9721313 | 6/1997 | (WO) | H04Q/7/22 |
| 9722216 | 6/1997 | (WO) | H04Q/7/22 |
| 9726764 | 7/1997 | (WO) | H04Q/7/22 |

OTHER PUBLICATIONS

International Search Report PCT/US99/16108, Nov. 18, 1999.
Perkins, C., IP Mobility Support, RFC 2002, Network Working Group, Request for Comments: 2002, Category: Standards Track, Oct. 1996.

* cited by examiner

Primary Examiner—William Trost
Assistant Examiner—Keith Ferguson
(74) Attorney, Agent, or Firm—Fulbright & Jaworski L.L.P.

(57) ABSTRACT

A telecommunication network node which integrates the voice and data services provided to a wireless mobile unit. The network node receives a request for information along with a voice network identification of the mobile unit via the signaling portion of the voice network. The network node performs a database lookup to determine a data network address of the mobile unit. This data network address may be a permanent data network address or a temporary data network address. The network node sends the information request to a data network service provider, whereby the request may be enhanced with information added by the network node. Upon receipt of the requested information from the data network service provider, the network node forwards the information to the mobile unit via the data network using the data network address.

20 Claims, 3 Drawing Sheets

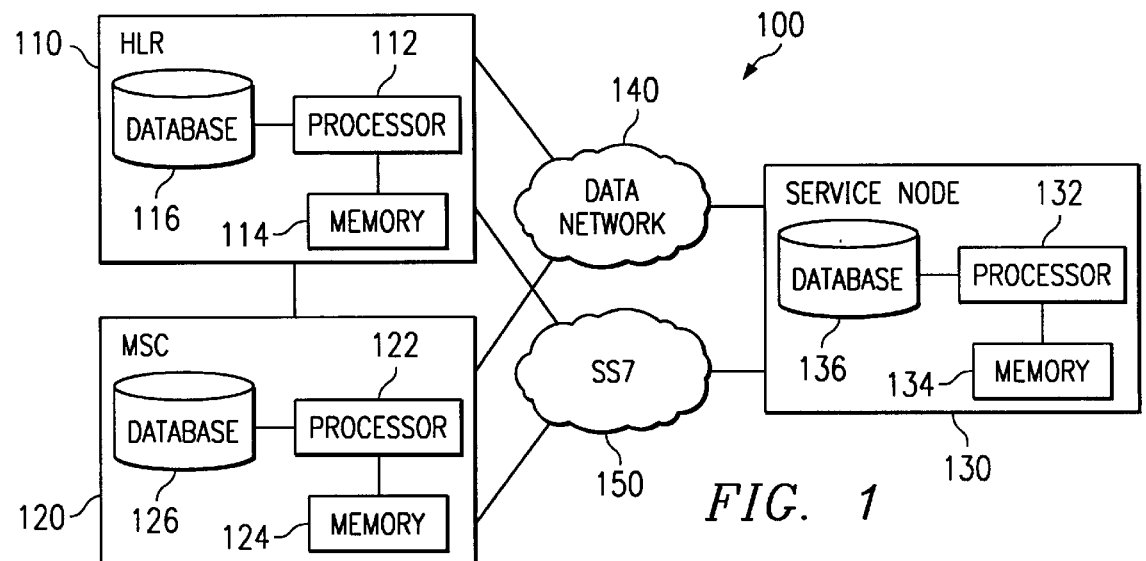
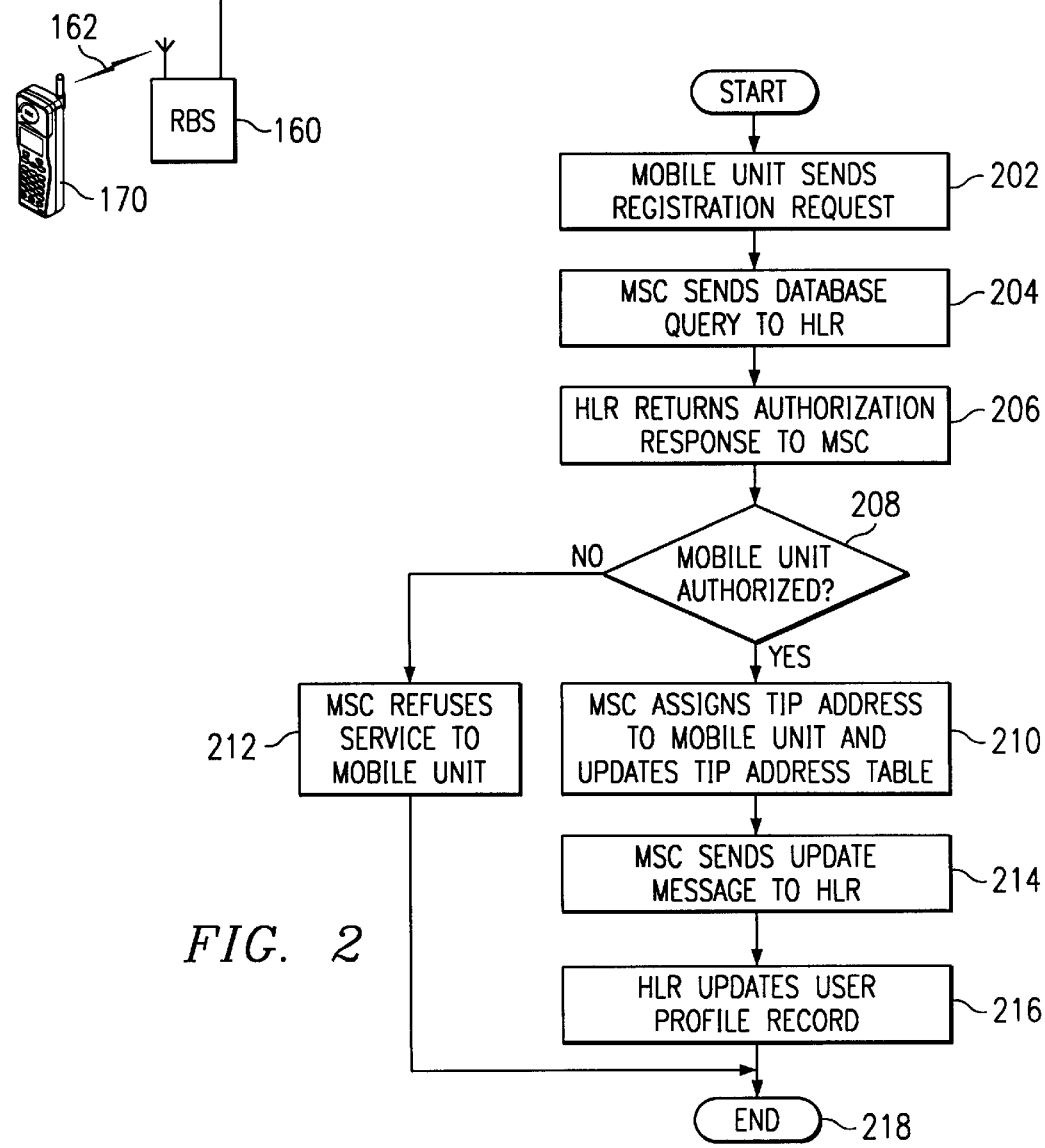
FIG. 1
FIG. 2

INTEGRATION OF VOICE AND DATA SERVICES PROVIDED TO A MOBILE WIRELESS DEVICE

FIELD OF THE INVENTION

The present invention relates generally to wireless communications. More particularly, the present invention relates to the integration of voice and data services provided to a mobile wireless device.

BACKGROUND OF THE INVENTION

Wireless communication devices, such as cellular telephones, are becoming increasingly popular. As is well known, cellular telephones communicate with a cellular communication network via cell sites which are located throughout a geographic serving area and which contain the elements required for wireless communication (e.g. radios and antennas). Each cell site serves a geographic area, called a cell. One of the major advantages of the use of a cellular telephone is mobility. That is, a cellular telephone user may continue to use a cellular telephone as the user travels within the geographic area served by the cellular communication network. As the cellular telephone moves from one cell to another, the call is "handed off" from one cell site to another cell site. Such mobility management of cellular telephones is well known in the art and is effective for providing continuous voice communications as the cellular telephone travels within the geographic serving area of the wireless communication network.

Wireless devices other than cellular telephones are also becoming popular. For example, wireless modems are available which allow mobile computing devices to transmit and receive data via a wireless communication network. Such mobile computing devices can receive packet data via packet data networks such as the Internet using the Internet Protocol (IP) for data communication. However, mobility management for such mobile computing devices presents a problem because IP was originally developed with the assumption that devices would be connected to the network at fixed locations. As such, a device would be assigned a unique IP address, which would define the device's physical connection to the network. Since a mobile computing device is not permanently connected to the network at any single point, an IP address associated with the mobile computing device does not define the device's physical connection to the network, thus violating an important assumption of IP addresses. Various techniques have been developed for mobility management as it relates to these mobile computing devices. One such technique is described in U.S. Pat. No. 5,159,592 which uses a nameserver and pseudo-IP addresses to associate fixed names of mobile units with the pseudo-IP addresses. Even though the pseudo-IP address may change, the current pseudo-IP address of a mobile unit can be determined by looking up the fixed name in the nameserver. A technique called tunneling is described in U.S. Pat. No. 5,325,362 which uses special routers to store current locations of mobile units in tables. When a router receives a packet for a mobile unit, the packet is forwarded, or tunneled, to the appropriate current location. U.S. Pat. No. 5,708,655 describes the assignment of temporary IP addresses to mobile units such that the mobile unit can provide the temporary IP address to another computer to effectuate the transfer of data between that computer and the mobile unit. These techniques provide some level of mobility management for mobile computing devices.

Currently there are devices, referred to herein as wireless voice and data devices, which combine the voice functionality of wireless cellular telephones with the data functionality of mobile computing devices. For example, AT&T Corp.'s PocketNet telephone combines a wireless cellular telephone with a mobile computing device. Such a device can be used to place voice telephone calls, and can also be used to communicate packet data via the Internet. For example, although somewhat limited, the PocketNet telephone is capable of browsing the World Wide Web (WWW) using its data functionality. Although these wireless voice and data devices are capable of combining the features of a cellular telephone and a mobile computing device, service providers have not taken advantage of the integration of these different services. Currently, voice and data services are provided separately by wireless service providers, and there is little, if any, interaction between the two operating modes. As a result of this separation of the voice and data functionality, the full benefits of such devices have yet to be realized.

SUMMARY OF THE INVENTION

I have recognized that by integrating voice and data services provided to wireless voice and data devices, substantial benefits can be realized. In accordance with the invention, a network node receives a voice network identifier of a mobile unit via a voice network. The network node performs a database lookup to determine the data network address of the mobile unit based on the voice network identifier. This data network address may be a permanent data network address or a temporary data network address. The network node may then transmit information to the mobile unit via the data network using the data network address.

The network node may request the information to be transmitted to the mobile unit from a data network service provider. Further, the information may be requested upon receipt of a request for information from the mobile unit, which request is received via the signaling portion of the voice network. The network node may also enhance the request received from the mobile unit, such that the request sent to the data network service provider contains information in addition to that received in the information request received from the mobile unit.

These and other advantages of the invention will be apparent to those of ordinary skill in the art by reference to the following detailed description and the accompanying drawings.

BRIEF DESCRIPTION OF THE DRAWINGS

FIG. 1 shows a high level block diagram of a communication network in which the present invention may be implemented;

FIG. 2 is a flowchart of the steps performed when a mobile unit registers for service with the communication network;

DETAILED DESCRIPTION

Figure 3A:
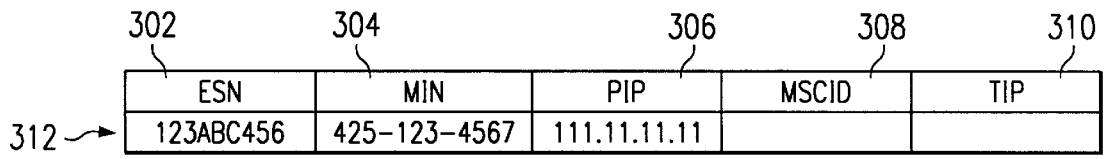
FIGS. 3A and 3B show user profile records.

FIG. 1 a communication network 100 in which the present invention may be implemented. A mobile unit 170 is communicating with a radio base station (RBS) 160 via a wireless communication link 162. The mobile unit 170 is a wireless voice and data device which can provide both voice communication functions and data communication functions. An example of such a device is AT&T's PocketNet telephone. The RBS 160 is connected to a mobile switching center (MSC) 120. The MSC 120 is typically connected to more than one RBS, where each RBS provides wireless communication to mobile communication devices operating within the geographic area (i.e., cell) served by the RBS. The MSC 120 controls the functions of the RBSs connected to it. Only one RBS 160 is shown in FIG. 1 for clarity.

MSC 120 is an intelligent switching device which operates under control of a computer processor 122 executing computer program instructions. The MSC 120 also includes memory 124 and database 126 for the storage of computer program instructions and other data. Although not shown in FIG. 1, one skilled in the art would recognize that MSC 120 would also contain other components in order to provide the switching functions typical in a wireless communication network.

The MSC 120 is connected to a home location register (HLR) 110. The HLR 110 is an intelligent network node which functions under control of computer processor 112 executing computer program instructions. The HLR 110 also includes memory 114 and database 116 for the storage of computer program instructions and other data. Database 116 is used to store user profile records for subscribers of wireless communication services. The database 116 and user profile records will be discussed in further detail below.

The HLR 110 and the MSC 120 are connected to a Signaling System No. 7 (SS7) network 150, which is an out-of-band signaling network used in telecommunication networks. These out of band signals convey, by means of labeled messages, signaling information relating to call setup, control, network management, and network maintenance. SS7 networks are well known in the art and will not be described in further detail herein. MSC 120 is also connected to other telecommunication networks, such as the public switched telephone network (not shown).

Also connected to the SS7 network 150 is service node 130 which performs certain of the functions required for the integration of voice and data services in accordance with the invention. Service node 130 is an intelligent network node which operates under control of a computer processor 132 executing computer program instructions. The service node 130 also includes memory 134 and database 136 for the storage of computer program instructions and other data.

The HLR 110, MSC 120, and service node 130 are also connected to a data network 140. In an advantageous embodiment, the data network 140 is a packet data network such as the Internet. As shown in FIG. 1, HLR 110, MSC 120, RBS 160, and SS7 Network 150 are components of a voice network which provide voice services to the mobile unit 170.

One skilled in the art will recognize that for purposes of clarity, FIG. 1 is a high level functional block diagram of communication network 100. The detailed architecture of such a network is well known in the art and such details are not important for an understanding of the present invention. Such details have been omitted from FIG. 1 for clarity. Further, various alternate embodiments are possible. For example, HLR 110 may share components such as database 116, processor 112, or memory 114 with the MSC 120.

Figure 5:
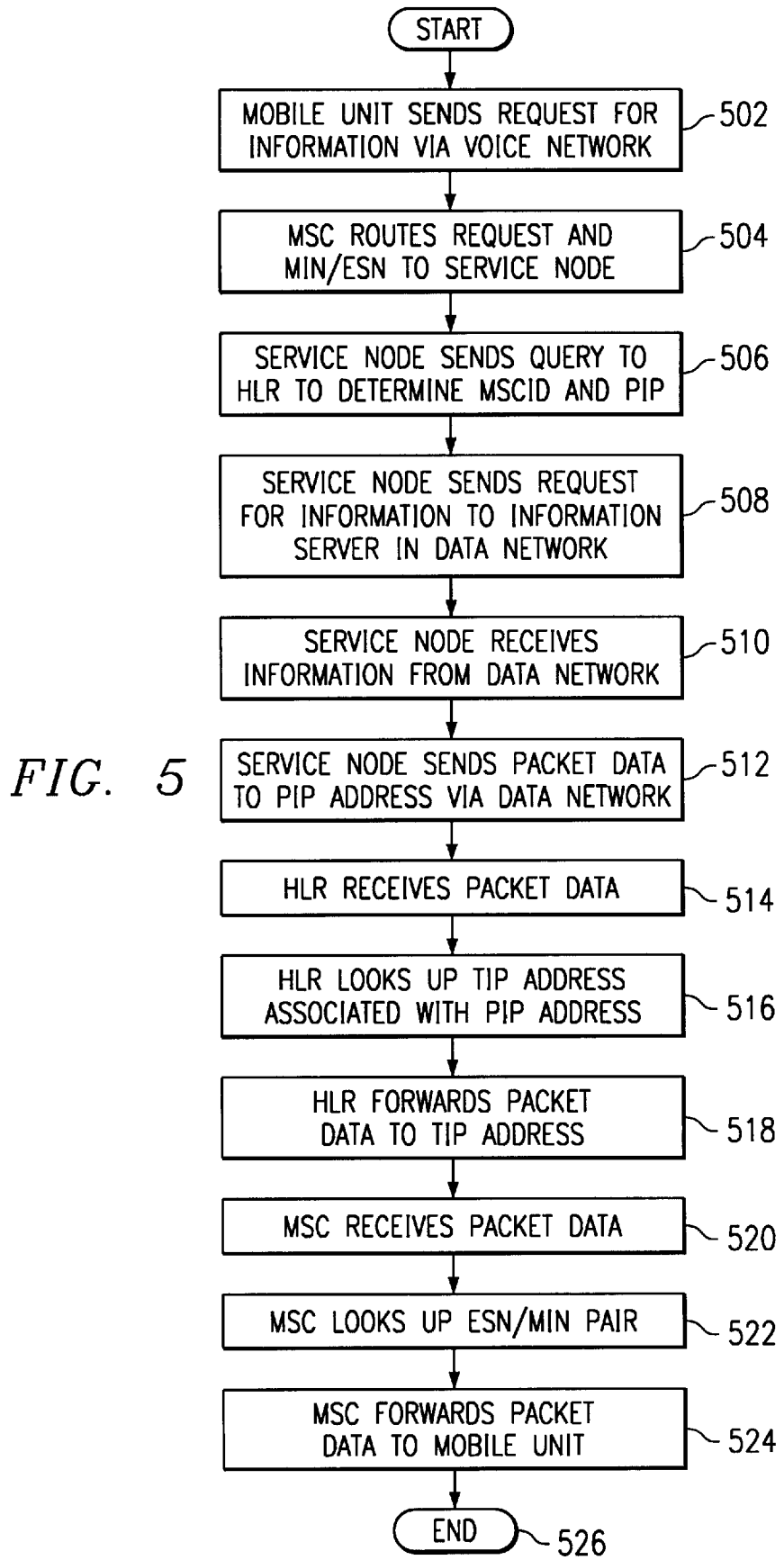
FIG. 5 is a flowchart of the steps performed when a registered mobile unit requests information via the voice network.

The steps performed in accordance with the present invention will be described in conjunction with the flowcharts of FIGS. 2 and 5. The flowchart of FIG. 2 shows the steps performed when mobile unit 170 registers for service with the communication network 100. When mobile unit 170 is powered on, it performs step 202 and sends a registration request to MSC 120 via air interface 162 and RBS 160. The registration request includes the electronic serial number (ESN) and mobile identification number (MIN) of mobile unit 170. The ESN is a unique serial number assigned to the mobile unit 170 during manufacture and cannot be changed. The MIN is the telephone number of the mobile unit 170 assigned by the service provider and can be changed. The ESN/MIN pair is a voice network identification and uniquely identifies mobile unit 170 to the voice network. Upon receipt of the registration request, the MSC 120 in step 204 sends a database query to HRL 110 to determine if this mobile unit 170 is authorized to obtain service from the network. HLR 110 determines whether the mobile unit 170 is authorized to obtain service from the network by accessing the user profile records stored in DB 116 of HLR 110.

FIG. 3A shows the user profile records stored in DB 116 of HLR 110. Each record contains the following fields: ESN 302, MIN 304, Permanent IP (PIP) address 306, identification of the current serving MSC (MSCID) 308, and Temporary IP (TIP) address 310. Fields 302 (ESN) and 304 (MIN) are the key fields and together they identify a unique user profile record. The PIP address is a permanent IP address which is assigned to a mobile unit upon provisioning of service by a service provider and is permanently associated with the mobile unit. The PIP address uniquely identifies a mobile unit to the data network 140. Field 308 contains an identification of the MSC which is currently providing service to a mobile unit. Field 310 contains a temporary IP address which is assigned to a mobile unit upon registration with a particular MSC, and is only assigned to that mobile unit during the time the mobile unit remains registered with that MSC. The use of the user profile record in accordance with the present invention will be described in further detail below. It would be understood that in practice a user profile record may contains fields in addition to those shown in FIG. 3A. For purposes of clarity only those fields necessary for a description of the present invention are shown in FIG. 3A.

Assume for purposes of the present example that mobile unit 170 has an ESN of 123ABC456, a MIN of 425-123-4567, and a permanent IP address of 111.11.11.11. The user profile record for mobile unit 170 is shown in FIG. 3A as record 312. Thus, at the time mobile unit 170 attempts to register with the MSC 120, there is a user profile record 312 in DB 116 of HLR 110 containing the ESN/MIN pair and the PIP address of mobile unit 170.

Returning now to FIG. 2, in step 206 the HLR 110 will return an authorization response to MSC 120 indicating that mobile unit 170 is authorized to receive service. Therefore, the test in step 208 is YES and control passes to step 210. If the test in step 208 were NO, the MSC 110 would refuse service to mobile unit 170 in step 212.

Figure 4:
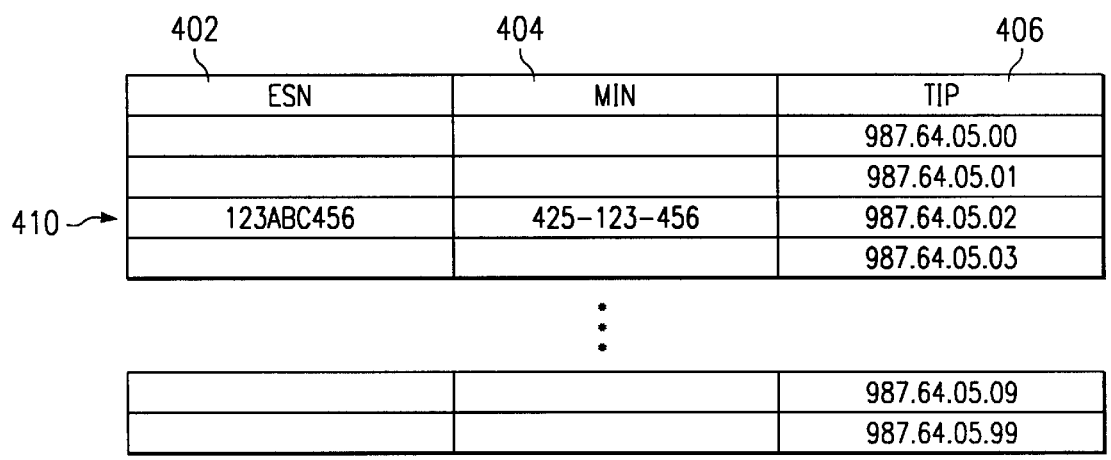
FIG. 4 shows an exemplary temporary IP address table.

In step 210, MSC 110 will assign a TIP address to the mobile unit 170 for use while the mobile unit 170 is obtaining service from MSC 120. MSC 120 has a pool of TIP addresses from which it can obtain a TIP address to assign to the mobile unit 170. These available TIP addresses are stored in a TIP address table in DB 126 of MSC 120. An exemplary TIP address table 400 is shown in FIG. 4. The TIP address table 400 has 3 fields, ESN 402, MIN 404, and TIP address 406. Assume that MSC 120 has 100 TIP addresses available to assign to the mobile units which it is providing service to. In such a case, the TIP address table 400 will have 100 records, one record for each TIP address. If there is no ESN/MIN pair in fields 402 and 404 respectively of a record, then the TIP address in field 406 of that record is available to be assigned to a mobile unit. Returning now to step 210 of FIG. 2, MSC 120 assigns a TIP address to mobile unit 170 as part of the registration process of mobile unit 170. Assume for purposes of this example that MSC 120 assigns TIP address 987.64.05.02 to mobile unit 170. As part of this assignment, MSC 120 will update record 410 in TIP address table 400 to associate the ESN/MIN pair of mobile unit 170 with TIP 987.64.05.02.

In step 214 MSC 120 sends an update message to HLR 110 to indicate that the user profile record associated with mobile unit 170 is to be updated with the TIP address and the MSCID of MSC 120. Assume for purposes of this example that MSC 120 has an MSCID of MSC001. As a result of the update message, HLR 110 updates the appropriate user profile record in step 216. The updated user profile record for mobile unit 170 in DB 116 of HLR 110 is shown as record 314 in FIG. 3B. The registration process ends in step 218.

Upon registration with the MSC 120, the mobile unit 170 may engage in voice communication via the voice network. There are certain voice communication activities which will result in a request for data to be sent back to the mobile unit 170. For example, there are certain commands, which if sent over the voice network, will be recognized by MSC 120 as a request for information. Such commands may be a special series of keys pressed by the user of the mobile unit 170 which are not routable telephone numbers but special codes to request information. One example is a request for traffic information, which may be transmitted from the mobile unit by pressing *TRAFFIC on a keypad of the mobile unit 170. In one prior technique, the MSC 120 recognizes this as a request for traffic information and may connect the mobile unit to an appropriate service provider who will provide traffic information to the user of mobile unit 170 via a voice call over the voice network. However, sometimes it is more appropriate to send textual and graphical information to the mobile unit rather than providing the information through voice communication. In another prior technique, such information may be sent back to the mobile unit via a paging function of the wireless communication device 170. This paging service is called short message service (SMS), and allows the mobile unit 170 to receive a short text message which is displayed on a display screen. This SMS service is provided via the voice network.

Figure 3B:
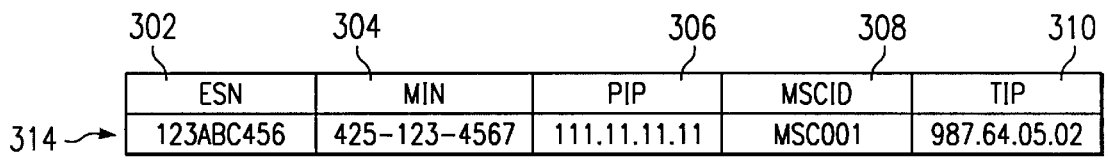

The present invention improves upon the known techniques by integrating voice and data services in order to fully realize the benefits of wireless voice and data devices such as mobile unit 170. In accordance with the invention, a request for information which is received via a voice network may be satisfied by information sent via a data network. The steps performed in accordance with the invention when a registered mobile unit requests information via the voice network are shown in the flowchart of FIG. 5. In step 502 the mobile unit 170 sends a request for information via the voice network. Assume for purposes of this example that the request is for local traffic conditions and the mobile unit 170 sends the request by transmitting "*TRAFFIC", along with its ESN/MIN pair, to the MSC 120 via the air interface 162 and RBS 160. The MSC 120 is configured to recognize the receipt of a *TRAFFIC code as a request for information. In step 504 MSC 120 routes the request to service node 130 by sending the *TRAFFIC request along with the ESN/MIN pair of the requesting mobile unit 170. In step 506 the service node 130 sends a query including the ESN/MIN pair of the mobile unit 170 to HRL 110 to obtain the MSCID and the PIP address associated with the mobile unit 170. In this example, the HLR 110 will return MSC001 as the MSCID and 111.11.11.11 as the PIP, which is the information stored in the user profile record 314 in DB 116 of HLR 110 as shown in FIG. 3B.

In step 508 the service node 130 sends a request for traffic information to an information server in data network 140. The service node 130 can store a list of appropriate service providers so that it can send requests for different types of information to the appropriate service provider in data network 140. Included in the request is the location for which the traffic information is requested. The location information is added to the request by the service node 130, which derives the location information from the MSCID of the current serving MSC or other means. Since MSCs are in fixed locations, the service node 130 can store location information for each MSCID. In certain networks, the location information obtained from the MSCID will not provide location information which is specific enough to be useful because the serving MSC serves too large a geographic area. In such a case, extra steps could be taken to determine the serving RBS which would provide more specific location information.

The service provider in the data network 140 will respond to the request for information by sending packet data to the service node 130. This packet data can contain traffic information in any of a number of formats. For example, the information can be in Hypertext Markup Language (HTML) if the mobile unit 170 is appropriately configured to display such information. This allows for the effective multimedia presentation of information to a user of mobile unit 170. Such a presentation of information is preferable over the simple voice and text communication of information of the prior techniques.

Returning now to FIG. 5, in step 510 the service node 130 receives the requested information from the data network 140. In step 512 the service node 130 sends the packet data via the data network 140 to the PIP address received in step 506. This PIP address directs the packet data to HLR 110. In step 514 the HLR 110 receives the packet data. In step 516 the HLR looks up the TIP address associated with the PIP address to which the packet was addressed. In this example, the PIP address will be 987.64.05.02 as indicated in field 310 of user profile record 314 (FIG. 3B). In step 518 the HLR 110 sends the packet data to TIP address 987.64.05.02. This directs the packet to MSC 120. In step 520 the MSC 120 receives the packet data. In step 522 the MSC 120 looks up the ESN/MIN pair associated with the TIP in TIP table 400 (FIG. 4). MSC 120 forwards the packet data to the mobile unit 170 via RBS 160 and air interface 162 in step 524. Upon receipt of the packet data, the mobile unit 170 displays the information as appropriate. The method ends in step 526.

In an alternate embodiment, in step 506 the service node 130 sends a query to HRL 110 to obtain the TIP address associated with the mobile unit 170 instead of the PIP address. In this example, the HLR will return 987.64.05.02 as the TIP address, which is the information stored in the user profile record 314 in DB 116 of HLR 110 as shown in FIG. 3B. Steps 508 and 510 proceed as described above. In step 512, the service node 130 may now send the packet data directly to the TIP address received in step 506, therefore eliminating the need for steps 514, 516, and 518. Processing then continues with step 520 as described above.

In accordance with another alternate embodiment, during the registration of mobile unit 170, the MSC 120 does not automatically assign a TIP address to the mobile unit 170. In the event that mobile unit 170 does not request any data to be sent to it, this embodiment will save processing steps and will also prevent the unnecessary assignment of a TIP address from the TIP address pool containing a finite number of TIP addresses. In this embodiment, immediately after registration, field 310 (FIG. 3B) of the user profile record 314 will be empty. However, field 306 of the user profile record 314 will contain the PIP address of the mobile unit 170. Thereafter, if the mobile unit 170 requests information in accordance with the steps of FIG. 5, the service node 130 in step 506 sends a query including the ESN/MIN pair of the mobile unit 170 to HRL 110 to obtain the current MSCID and the PIP address associated with the mobile unit 170. The HLR 110 replies as described above. In addition, since it is known that the mobile unit 170 will soon be receiving packet data via the data network 140, at this time the HLR 110 sends a message to the MSC 120 requesting a TIP address from the pool. The MSC 120 assigns a TIP address, updates the TIP table 400, and sends the assigned TIP address to HLR 110 so that the HLR 110 can update the user profile record 314 with the newly assigned TIP address. Thus, in accordance with this embodiment, TIP addresses are only assigned as needed.

Thus, in accordance with the present invention, the mobile unit 170 requests information by a request sent via the voice network, and the service node 130 manages that request so that the requested information can be returned via the data network 140. In this manner, information can be presented to the user of mobile unit 170 in a multimedia format, including text, graphics, and sound. It is this integration of voice and data services in accordance with the present invention which allows realization of the benefits of a wireless voice and data device.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A method for providing data information that is routed through a data network to a wireless unit in response to a data request that is made by the wireless unit over a voice network, comprising the steps of:
    assigning a data network address and a voice network address to said wireless unit thereby causing said wireless unit to be simultaneously present upon said data network and the voice network, wherein the voice network address is used to route voice calls to the wireless unit;
    receiving the voice network address of said wireless unit at a network service node as part of a data request by the wireless unit, wherein the data request is sent via the voice network;
    performing a database lookup to retrieve said data network address of said wireless unit using said voice network address, wherein said data network address and said voice network identifier are associated with the same wireless device; and
    transmitting requested data information to the wireless unit through said data network using said data network address without establishing a voice connection to the wireless unit in response to the data request.

2. The method of claim 1, wherein said voice network address is received via a signaling portion of said telephony network.

3. The method of claim 1, further comprising the step of:
    receiving a first data information request from said wireless Unit.

4. The method for claim 3, wherein said first data information request is initiated by digits dialed on the wireless device.

5. The method of claim 3, further comprising the step of:
    said network service node sending a second data information request to a data network information server.

6. The method of claim 5, further comprising the step of:
    said network service node adding information to said second request for information, wherein said added information was not included in said first request for information.

7. The method of claim 1, further comprising the step of:
    said network service node receiving information from an information server via said data network; and
    wherein said information transmitted to said data network address for the wireless device comprises said information received from said information server.

8. The method of claim 1 wherein said step of transmitting further comprises the step of transmitting packet data using internet protocol.

9. The method of claim 1 wherein said data network address is a permanent data network address.

10. The method of claim 1 wherein said data network address is a temporary data network address.

11. A computer readable medium storing computer program instructions capable of execution on a computer system for controlling the operation of a telecommunication network node and for routing packet data over a data network to a wireless device in response to a data request from the wireless device, said computer program instructions defining the steps of:
    receiving a voice network address of the wireless device as part the of the data request, wherein said data request is sent via the voice network and wherein the voice network address is used to establish voice call connections with the wireless device;
    performing a database lookup to retrieve a data network address of said wireless device using said voice network address, wherein said data network address has been previously assigned to said mobile unit; and
    sending packet data corresponding to information that was requested by the wireless device, wherein the packet data is routed through said data network using said data network address without establishing a voice connection to the wireless device in response to the data request.

12. The computer readable medium of claim 11, further storing computer program instructions defining the steps of:
    receiving a first request for data information, the first request including the voice network address.

13. The computer readable medium of claim 12, further storing computer program instructions defining the steps of:
    sending a second request for data information to a data network information server, the second request for data information based on said first request for data information.

14. The computer readable medium of claim 13, further storing computer program instructions defining the steps of:

adding information to said second request for data information, wherein said added information was not included in said first request for data information.

15. A telecommunications network node for providing information to a wireless device in response to information requests from the wireless device, comprising:

a computer processor coupled to a data network and to a voice network;

a memory connected to said computer processor for storing computer program instructions for execution on said computer processor, said computer program instructions defining the steps of:

receiving an information request from the wireless device, the information request being sent over the voice network and including a voice network address for the wireless device;

performing a database lookup to retrieve a data network address for the wireless device, wherein said data network address and the voice network address have been previously assigned to said wireless device; and sending packet data to the wireless device using the data network address to route the packet data, wherein the packet data comprises information provided in response to the information request from the wireless device without establishing a voice connection to the wireless device in response to the information request.

16. The telecommunications network node of claim 15, further storing computer program instructions defining the steps of:

receiving a first information request in the form of digits dialed on the wireless device.

17. The telecommunications network node of claim 16, further storing computer program instructions defining the steps of:

sending a second information request to a data network information server, the second information request based on said first information request.

18. The telecommunications network node of claim 17, further storing computer program instructions defining the steps of:

adding information to said second information request, wherein said added information was not included in said first information request.

19. A method of providing requested information to a wireless device, the wireless device capable of communication with both voice networks and data networks via a wireless network connection, the wireless device having a voice network identifier that is used to establish communications via the voice network and a corresponding data network identifier that is used to establish communications via the data network, the method comprising:

receiving a command from the wireless device via the voice network, the command including the voice network identifier;

identifying the command as a request for information that is to be sent to the wireless device;

correlating the voice network identifier to the corresponding data network identifier for the wireless device;

obtaining the requested information; and sending the requested information to the wireless device via the data network using the data network identifier to route the information.

20. The method of claim 19 wherein the data network address is a temporary address on the data network that is assigned following receipt of the information request command.

* * * * *